(12) United States Patent
Allen

(10) Patent No.: US 10,234,649 B2
(45) Date of Patent: Mar. 19, 2019

(54) FABRIC ENCASED MICRO TUBES FOR AIR BLOWN FIBERS

(71) Applicant: WESCO Distribution, Inc., Pittsburgh, PA (US)

(72) Inventor: Jerry L. Allen, Sarasota, FL (US)

(73) Assignee: WESCO Distribution, Inc., Pittsburgh, PA (US)

( * ) Notice: Subject to any disclaimer, the term of this patent is extended or adjusted under 35 U.S.C. 154(b) by 0 days.

(21) Appl. No.: 15/640,784

(22) Filed: Jul. 3, 2017

(65) Prior Publication Data

US 2019/0004271 A1    Jan. 3, 2019

(51) Int. Cl.
*G02B 6/44*    (2006.01)
*G02B 6/50*    (2006.01)

(52) U.S. Cl.
CPC ........... *G02B 6/4459* (2013.01); *G02B 6/443* (2013.01); *G02B 6/4464* (2013.01); *G02B 6/504* (2013.01)

(58) Field of Classification Search
CPC .... G02B 6/4404; G02B 6/446; G02B 6/4461; G02B 6/4465; G02B 6/54; G02B 6/50; G02B 6/52
See application file for complete search history.

(56) References Cited

U.S. PATENT DOCUMENTS

| | | | | |
|---|---|---|---|---|
| 2,585,054 | A | * | 2/1952 | Stachura ................ H01B 11/06 138/123 |
| 3,272,912 | A | * | 9/1966 | Jachimowicz ...... B29C 47/0023 138/139 |
| 4,052,911 | A | * | 10/1977 | Feldstein .................. F16C 1/26 74/502.5 |
| 4,064,355 | A | * | 12/1977 | Neroni ...................... A47L 9/24 138/115 |
| 4,468,089 | A | * | 8/1984 | Brorein ................ G02B 6/4403 156/53 |
| 4,582,093 | A | * | 4/1986 | Hubbard .............. G02B 6/4439 138/111 |

(Continued)

FOREIGN PATENT DOCUMENTS

NL    1035047 C2    8/2009

OTHER PUBLICATIONS

International Search Report and Written Opinion (International Application No. PCT/US2018/039439) (12 pages—dated Nov. 26, 2018).

(Continued)

*Primary Examiner* — Rhonda S Peace
(74) *Attorney, Agent, or Firm* — Renner, Kenner, Greive, Bobak, Taylor & Weber

(57) ABSTRACT

A device to be inserted into a conduit includes at least one tube intended to receive optic fibers or micro fiber optic cables therein. A jacket surrounds the tube. In an embodiment where there are a plurality of tubes, they are loosely aligned within the jacket. In another embodiment, opposed surfaces of the jacket are attached to each other to form compartments for each tube. In still another embodiment, the jacket holds the tubes generally in a bundle. The jacket of a tube may also be attached to one or more innerducts, each of which can receive a fiber optic cable. Alternatively, an innerduct may be attached to two jackets each of which carry a tube therein.

9 Claims, 2 Drawing Sheets

(56) References Cited

U.S. PATENT DOCUMENTS

| | | | | |
|---|---|---|---|---|
| 4,741,593 A * | 5/1988 | Fochler | G02B 6/4459 | 138/111 |
| 4,970,351 A * | 11/1990 | Kirlin | H02G 3/0406 | 138/121 |
| 5,029,815 A * | 7/1991 | Kumpf | G02B 6/4459 | 254/134.3 FT |
| 5,236,016 A * | 8/1993 | Vogelsang | H02G 3/0487 | 138/111 |
| 5,360,291 A * | 11/1994 | Shimizu | F16L 1/24 | 254/134.3 R |
| 5,413,149 A * | 5/1995 | Ford | D03D 3/02 | 138/103 |
| 6,304,698 B1 * | 10/2001 | Morris | G02B 6/4459 | 138/111 |
| 6,398,190 B1 * | 6/2002 | Li | G02B 6/4459 | 254/134.3 FT |
| 6,571,833 B1 * | 6/2003 | McLarty, III | G02B 6/4459 | 112/155 |
| 6,774,311 B1 * | 8/2004 | Byun | B29C 47/126 | 138/115 |
| 6,963,031 B2 * | 11/2005 | Gladfelter | F16L 3/26 | 174/74 A |
| 7,046,898 B2 * | 5/2006 | McLarty, III | G02B 6/4459 | 385/134 |
| 7,319,802 B2 * | 1/2008 | Morris | G02B 6/4459 | 385/100 |
| 7,402,754 B2 * | 7/2008 | Kirwan, Jr. | A61B 18/12 | 174/110 R |
| 7,460,753 B2 * | 12/2008 | Kewitsch | G02B 6/4478 | 385/100 |
| 9,054,507 B2 * | 6/2015 | Allen | H02G 1/08 | |
| 9,355,755 B2 * | 5/2016 | Gundel | H01B 7/0838 | |
| 9,362,725 B2 * | 6/2016 | Morris | H02G 3/0412 | |
| 9,396,840 B2 * | 7/2016 | Mizutani | H02G 3/0481 | |
| 9,692,217 B2 * | 6/2017 | Parkinson | H01B 3/44 | |
| 2001/0046356 A1 * | 11/2001 | Morris | G02B 6/4459 | 385/100 |
| 2003/0095762 A1 | 5/2003 | Brown | | |
| 2005/0194578 A1 * | 9/2005 | Morris | G02B 6/4459 | 254/134.3 FT |
| 2006/0193570 A1 * | 8/2006 | Brown | G02B 6/4459 | 385/100 |
| 2008/0054236 A1 * | 3/2008 | Morris | G02B 6/4459 | 254/134.4 |
| 2008/0264669 A1 * | 10/2008 | Bedingfield | G02B 6/4459 | 174/97 |
| 2012/0090873 A1 * | 4/2012 | Gundel | H01B 7/0861 | 174/113 R |
| 2013/0117993 A1 * | 5/2013 | Allen | H02G 1/08 | 29/428 |
| 2014/0353561 A1 * | 12/2014 | Chen | G02B 6/4465 | 254/134.4 |

OTHER PUBLICATIONS

Anonymous: "K-net BluLight—Infrastructure Sharing", Mar. 1, 2015, retrieved from the Internet on Nov. 13, 2018 (2 pages).

* cited by examiner

FABRIC ENCASED MICRO TUBES FOR AIR BLOWN FIBERS

TECHNICAL FIELD

This invention relates to a system of tubes which are adapted to receive optic fibers in the communications industry. More particularly, this invention relates to such tubes which are encased in a fabric material.

BACKGROUND ART

Traditional communications systems utilize one or more cables which are often installed in a conduit which is often positioned underground. The installation of the cables in such a system can be a time-consuming and expensive proposition.

As an alternative to these conventional systems, micro fiber optic cables or optic fibers are sometimes utilized for these communication systems. In one alternative, a rigid innerduct or tube, usually made of a high density polyethylene, is provided with a plurality of micro tubes. Such innerducts are acceptable for direct burial, but when they are provided on a reel for installation into an underground conduit, installation into the conduit is difficult because the rigid innerducts have reel memory and will often spiral during installation. Moreover, such rigid innerducts are costly and difficult to cut in order to gain access to the micro tubes. That is, when installed, at least the majority of the tubes are empty, but when one or more tubes are needed to house optic fibers, the conduit must be unearthed at some location and cut, then the innerduct must be cut, and then the micro tubes must be cut so that the fibers can be blown therein. Such is a difficult and time-consuming process.

As another alternative, attempts have been made to install single plastic micro tubes into a conduit. Such are quite flimsy and hard to handle, and they tend to deform, that is, usually ovalize and sometimes stretch during installation. If ovalized, it is difficult to blow the optic fibers into them for any significant distance. And if stretched, the fibers cannot be blown into them at all.

In an effort to solve the problems of the single tubes, a system exists where a plurality of micro tubes of high density polyethylene are joined by a web of that plastic. However, such tubes connected by a web cannot float independent of each other. This is, a tube can only undulate or flex in one direction relative to the tube adjacent to it. As a result, when going around bends often encountered in an underground conduit, the joined tubes will twist and deform rendering the installation of the optic fibers difficult, if not impossible.

In addition, it is often desirable to place micro fiber optic cables or optic fibers in the same conduit with a conventional fiber optic cable. No device exists in the prior art which can conveniently allow the introduction of both micro cables or fibers and conventional communications cables in the same conduit.

Thus, the need exists for a system of tubes which is easier to install, which can be easily accessed to receive communications fibers, which has minimal reel memory, and which is lighter in weight and less expensive than the rigid innerduct of the prior art.

DISCLOSURE OF THE INVENTION

It is thus an object of one aspect of the present invention to provide a device which renders it easy to insert communication micro cables or optic fibers into tubes positioned in a conduit.

It is an object of another aspect of the present invention to provide a device, as above, which can render it easy to insert a communications cable into the conduit already having a tube.

It is an object of an additional aspect of the present invention to provide a device, as above, which is easy to install and less costly than that of the prior art.

These and other objects of the present invention, as well as the advantages thereof over existing prior art forms, which will become apparent from the description to follow, are accomplished by the improvements hereinafter described and claimed.

In general, a device adapted to be inserted into a conduit includes a at least one longitudinally extending hollow tube which is adapted to receive optic fibers or micro fiber optic cables therein. A longitudinally extending pliant jacket surrounds the tube.

Preferred exemplary devices according to the concepts of the present invention is shown by way of example in the accompanying drawings without attempting to show all the various forms and modifications in which the invention might be embodied, the invention being measured by the appended claims and not by the details of the specification.

PREFERRED EMBODIMENTS FOR CARRYING OUT THE INVENTION

Figure 1:
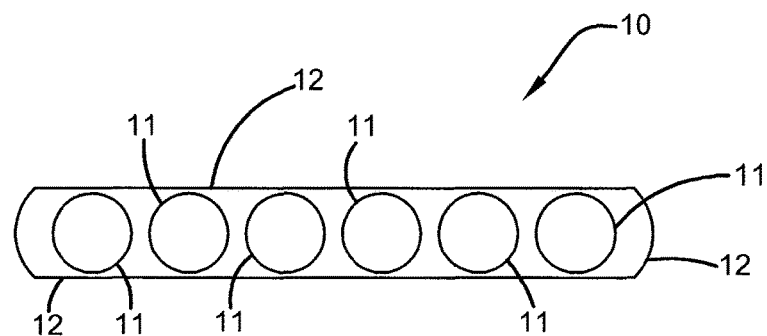
FIG. 1 is a somewhat schematic end view of fabric encased micro tubes made in accordance with one embodiment of the present invention.

One embodiment of a device which is adapted to be inserted into a conduit is indicated generally by the numeral 10 and shown in FIG. 1. Device 10 includes a plurality of longitudinally extending hollow micro tubes 11 which are adapted to receive micro fiber optic cables or air blown optic fibers therein. Tubes 11 are typically made of a thin plastic material such as high density polyethylene (HDPE). As such, they are hard, but, at some point in time, they may be easily severed at some point along their length, and the optic fibers then can be longitudinally blown therein. Moreover, tubes 11 may be considered to be "rigid". That is, as used herein, "rigid" means reasonably stiff and yet capable of being flexed so that a long length of tubes 11 may be wound on a reel.

A plurality of tubes 11 are encased in a longitudinally extending pliant sheath or jacket 12 which is preferably made of a low friction fabric material. The tubes 11 are shown as being adjacent to, and aligned with, each other. However, jacket 12 can be folded or otherwise easily manipulated so that it and the tubes 11 can fit into a conduit which is typically installed underground. The low friction of the fabric jacket 12 renders installation into the conduit easier. When the time comes that one or more of the tubes 11 are needed to provide a communications system to a user, access is gained to device 10 and the jacket 12 can be easily severed to gain access to the tubes 11. Then the tube or tubes 11 which are needed can be severed and the optic fibers can be readily blown therein.

Figure 2:
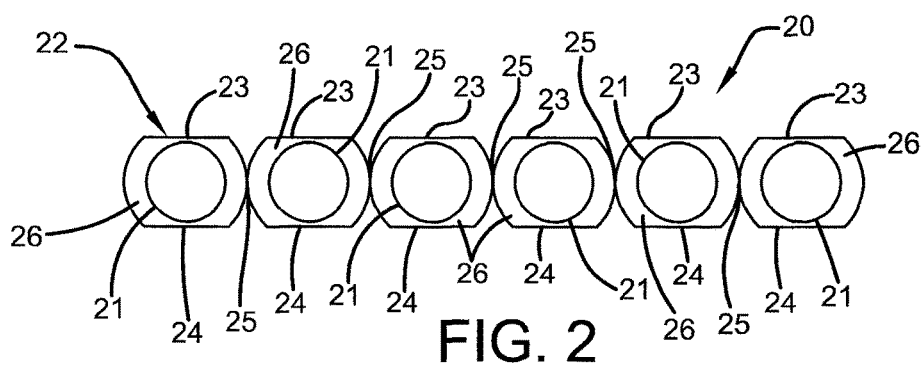
FIG. 2 is a somewhat schematic end view of fabric encased micro tubes made in accordance with another embodiment of the present invention.

Another embodiment of the device is shown in FIG. 2 and indicated generally by the numeral 20. There, a plurality of longitudinally extending hollow, rigid tubes 21 are shown which can be of the same nature and construction as tubes 11. Tubes 21 are received in a pliant sheath or jacket 22 which is preferably made of a low friction fabric material. Jacket 22 is generally identical to jacket 12 except that its upper surface 23 is connected to its lower surface 24, as at 25, at laterally spaced locations preferably between each tube 21. Connections 25 can be a stitching that extends longitudinally along the entire length of device 20. As such, jacket 22 is divided into longitudinally extending compartments 26, each of which are intended to carry a tube 21. Like jacket 12, jacket 22 can be easily manipulated to fit into a communications conduit. In so doing, the tubes are free to move in all directions because unlike the prior art, they are not attached. When the time comes that one or more of the tubes 21 are needed for a communications system, one or more compartments 26 of the jacket 22 can be opened to gain access to the tube 21 therein so that the tube may be severed to receive the optic fibers.

Figure 3:
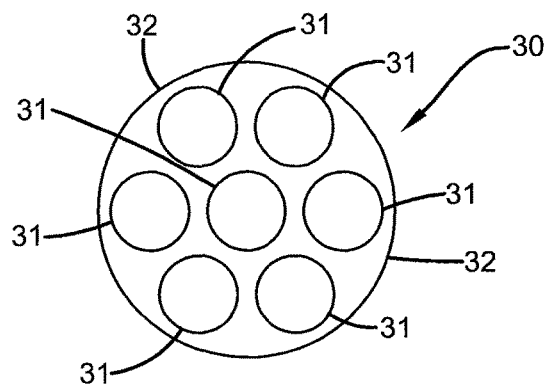
FIG. 3 is a somewhat schematic end view of fabric encased micro tubes made in accordance with yet another embodiment of the present invention.

Another alternative embodiment of the device is indicated generally indicated by the numeral 30 and shown in FIG. 3. In this embodiment, a plurality of longitudinally extending rigid, hollow tubes 31, which may be identical in nature and construction to tubes 11 and 21, are arranged in a bundle or in a generally circular profile. The tubes 31 are encompassed and held together by a pliant sheath or jacket 32 which is preferably made of a low friction fabric material. By being arranged and held in a generally circular configuration, no manipulation is required in order to insert the device 30 into a conduit. When access to one or more tubes is needed, jacket 32 may be easily severed to expose the tubes 31 which may be selectively severed to receive the blown optic fibers.

Figure 4:
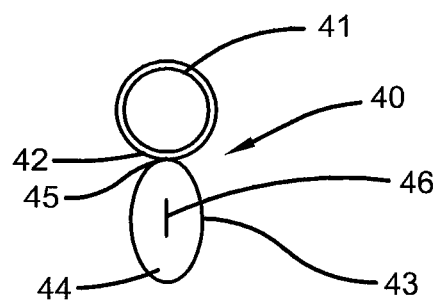
FIG. 4 is a somewhat schematic end view of a fabric encased micro tube with an integral innerduct for a communications cable made in accordance with yet another embodiment of the present invention.
Figure 5:
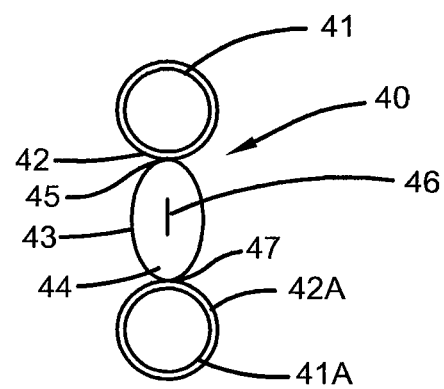
FIG. 5 is a somewhat schematic end view of another embodiment of that shown in FIG. 4.
Figure 6:
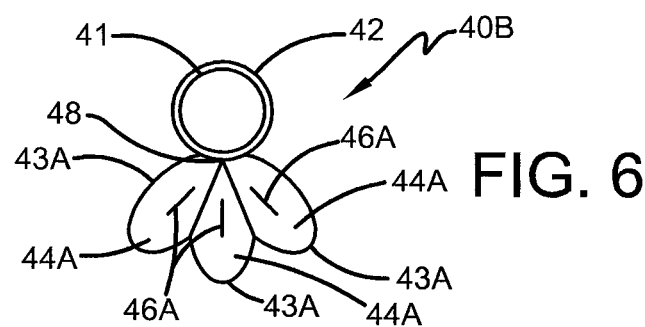
FIG. 6 is a somewhat schematic end view of another embodiment of that shown in FIGS. 4 and 5.

If it is desired to provide a conduit with the ability to easily receive optic fibers and a conventional communications fiber optic or coaxial cable, the embodiments of FIGS. 4-6 may be employed. The device of the embodiment shown in FIG. 4 is generally indicated by the numeral 40. Device 40 includes a rigid, hollow, longitudinally extending tube 41 which may be identical in nature and construction to tubes 11, 21 and 31. A jacket 42, which is preferably made of a low friction fabric material, is provided around tube 41 for its entire length. An innerduct 43, preferably made of the same material as jacket 42, is attached to jacket 42 and, as is known in the art, innerduct 43 forms a longitudinally extending compartment 44 which, when in a conduit, is adapted to receive a conventional fiber optic communications cable.

Jacket 42 and innerduct 43 may be separate items which are attached, as at 45, by stitching or the like, or they may be formed of one continuous piece of material with its ends being stitched, or otherwise connected to each other and to itself, as at 45, to form jacket 42 and innerduct 43. For purposes of being able to pull the cable into compartment 44, an insertion device 46, such as a pull tape or a rope, is provided in compartment 44. When device 40 is positioned in a longitudinally extending conduit, and when it is desired to position optic fibers in tube 41, jacket 42 may be easily severed to gain access to tube 41 which may be severed to receive the blown optic fibers. Likewise, when it is desired to position a fiber optic communication cable in the conduit, it may be attached to insertion device 46 and pulled into compartment 44 of innerduct 43.

FIG. 5 depicts a variation to the device shown in FIG. 4 just described. As shown in FIG. 5, device 40A includes a second tube 41A and jacket 42B combination attached to the other end of innerduct 43. Jacket 42A and innerduct 43 may be separate items attached, as at 47. Or, like device 40, jacket 42, innerduct 43 and jacket 42B may be formed of one continuous piece of material. In that instance, the ends of the material may meet at 45 or 47 and at that location they are stitched or otherwise connected to each other and to itself. At the other location, 45 or 47, the material may be connected to itself thus forming compartment 44 with a tube 41 encased in a fabric jacket 42 on each end thereof. Compartment 44 carries an insertion device 46. As such, when device 40A is positioned in a conduit, there is capacity to insert two sets of blown optic fibers or micro fiber optic cables and one fiber optic cable into the conduit.

FIG. 6 depicts a variation of the device of FIGS. 4 and 5. In this device 40B, a single tube 41 and jacket 42 combination is provided just like that of FIG. 4. However, device 40B includes a plurality, three shown, of innerducts 43A forming compartments 44A each of which may carry an insertion device 46A positioned in a compartment 44A. Such a three compartment innerduct is shown, for example, in U.S. Pat. No. 6,251,201 to which reference is made for whatever detail may be necessary to understand the construction of device 40B.

Thus, FIG. 6 shows three innerducts 43A attached to jacket 42 in the same manner that innerduct 43. That is, innerducts 43A may be separately formed and all stitched, or otherwise connected, as at 48, to the ends of jacket 42, or jacket 42 and innerducts 43 could be formed of one continuous piece of material with its ends stitched to each other and stitched to itself at multiple places, all at 48, to form compartments 44A. As a result, a conduit having device 43B may efficiently be used to place one set of blown optic fibers and three fiber optic cables in the conduit.

It should thus be appreciated that a device constructed in accordance with any of the embodiments described herein will accomplish the objects of the invention and substantially improve the art.

What is claimed is:

1. A device adapted to be inserted into a conduit, the device comprising at least one longitudinally extending hollow rigid tube adapted to receive optic fibers or micro fiber optic cables therein, and a longitudinally extending pliant jacket surrounding said tube, said jacket having a first surface and an opposed second surface, said surfaces being attached at their end, said first surface directly engaging said second surface and being longitudinally fixed to said second surface at laterally spaced locations forming longitudinally extending compartments.

2. The device of claim 1 wherein there are a plurality of tubes and said laterally spaced locations are between each said tube so that a said tube is in each said compartment.

3. The device of claim 2 wherein said tubes are made of a thin plastic material.

4. The device of claim 3 wherein said pliant material is a fabric.

5. A device to be inserted into a conduit, the device comprising at least one longitudinally extending hollow tube adapted to receive optic fibers or micro fiber optic cables therein, a longitudinally extending pliant jacket surrounding said tube, and a longitudinally extending innerduct made of a pliant material and forming a compartment, said innerduct being permanently fixed along substantially its entire longitudinally extent to said jacket.

6. The device of claim 5 further comprising an insertion device positioned in said compartment.

7. A device to be inserted into a conduit, the device comprising at least one longitudinally extending hollow tube adapted to receive optic fibers or micro fiber optic cables therein, a longitudinally extending pliant jacket surrounding said tube, and an innerduct made of a pliant material and forming a compartment, said innerduct being fixed to said jacket, a second longitudinally extending hollow tube adapted to receive optic fibers or micro fiber optic cables therein, and a second longitudinally extending pliant jacket surrounding said second tube, said second jacket fixed to said innerduct.

8. A device to be inserted into a conduit, the device comprising at least one longitudinally extending hollow tube adapted to receive optic fibers or micro fiber optic cables therein, a longitudinally extending pliant jacket surrounding said tube, and a plurality of innerducts made of a pliant material and each forming a compartment, said innerducts being fixed to said jacket.

9. The device of claim 8 further comprising an insertion device positioned in each said compartment.

* * * * *